(12) United States Patent
Johansson et al.

(10) Patent No.: US 7,549,267 B2
(45) Date of Patent: Jun. 23, 2009

(54) SEALING DEVICE

(75) Inventors: Mats Johansson, Eslov (SE); Hakan Zetterstrom, Eslov (SE); Bengt Salmose, Ahus (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/533,876

(22) PCT Filed: Dec. 9, 2003

(86) PCT No.: PCT/SE03/01909

§ 371 (c)(1),
(2), (4) Date: May 5, 2005

(87) PCT Pub. No.: WO2004/054879

PCT Pub. Date: Jul. 1, 2004

(65) Prior Publication Data

US 2006/0016158 A1    Jan. 26, 2006

(30) Foreign Application Priority Data

Dec. 13, 2002    (SE) .................................... 0203701

(51) Int. Cl.
*B65B 51/14* (2006.01)
(52) U.S. Cl. ........................ 53/374.9; 53/371.9; 53/491; 53/565; 493/184; 493/452
(58) Field of Classification Search .................. 53/491, 53/477, 371.9, 372.7, 374.9, 565; 493/184, 493/452
See application file for complete search history.

(56) References Cited

U.S. PATENT DOCUMENTS

| | | | |
|---|---|---|---|
| 2,085,478 A | | 6/1937 | Scott |
| 2,798,349 A | | 7/1957 | Mojonnier |
| 3,220,161 A | * | 11/1965 | Lohse et al. ............... 53/370.6 |
| 3,280,531 A | * | 10/1966 | Meyer-Jagenberg ......... 53/458 |
| 3,579,958 A | * | 5/1971 | Hentges et al. ............... 53/565 |
| 3,789,746 A | * | 2/1974 | Martensson et al. ........... 53/563 |
| 4,241,560 A | * | 12/1980 | Deimel et al. .............. 53/374.9 |
| 4,546,592 A | | 10/1985 | Reil |
| 4,738,077 A | * | 4/1988 | Wakbayashi et al. ....... 53/372.7 |
| 5,588,279 A | * | 12/1996 | Runnberg et al. ............. 53/426 |
| 6,430,899 B1 | | 8/2002 | Cicha |

FOREIGN PATENT DOCUMENTS

| | | | |
|---|---|---|---|
| EP | 0 247 249 A1 | | 12/1987 |
| EP | 0 466 271 A1 | * | 1/1992 |
| GB | 484 284 A | | 5/1938 |
| GB | 2017041 A | | 9/1979 |
| JP | 51-78490 | | 7/1976 |
| JP | 4-56603 U | | 5/1992 |
| JP | 4-279407 A | | 10/1992 |
| WO | WO 9843876 A1 | | 10/1998 |

* cited by examiner

*Primary Examiner*—Thanh K Truong
(74) *Attorney, Agent, or Firm*—Buchanan Ingersoll & Rooney PC (57) ABSTRACT

An apparatus 10 for sealing packages 20 is to be mounted as a part of a larger packaging machine, which fills packages 20 with products or substances, preferably food or beverages but could be any other suitable substance, then closes and seals the packages using the sealing apparatus 10 by folding each package transversally, thereby closing it and sealing the transversal fold, and subsequently delivers the packages to a final folding station.

28 Claims, 11 Drawing Sheets

SEALING DEVICE

TECHNICAL FIELD

The present invention relates to a sealing device or apparatus for sealing packages containing a product. The sealing apparatus is to be mounted as a part of a larger packaging machine, which fills packages with products or substances, preferably food or beverages but could be any other suitable substance, then closes and seals the packages using the sealing apparatus by folding each package transversally, thereby closing it and sealing the transversal fold, and subsequently delivers the packages to a final folding station.

Moreover, the present invention also relates to a method using the sealing apparatus/device for sealing the packages.

PRIOR ART

In a packaging apparatus, such as an apparatus for packages containing a fluid, preferably liquid or food of different kinds, it is of importance that the transversal sealing of the package is leakproof. The sealing is performed after folding of the package.

The sealing of the package depends on several parameters, e.g. the type of packaging material used in the package, the thickness of the packaging material etc, which in turn affects the folding of the transversal joints to be sealed on the package.

This means that the folding of the transversal joint has to be done with sufficient or close tolerances, e.g. by aligning the folding and sealing equipment so that they correspond to each other and do not counteract, and/or by holding/supporting the package firmly during folding and subsequent sealing so that the package is held in place and is formed or folds as desired.

U.S. Pat. No. 4,546,592 discloses an apparatus for sealing a liquid package made of paper coated with plastic, the apparatus includes a pair of extending fingers for flattening the top edge of the package with the folded seam strip. The fingers are insertable in the open end of the package and driven for an extending movement. The apparatus also comprises a pair of welding jaws fixed to pivoted levers. The fingers and their actuation means are mounted above the package.

A disadvantage with U.S. Pat. No. 4,546,592 is that wear of moving parts may create a bigger risk of having material on the fingers and their actuation means coming loose and falling down into the package before it is folded and sealed. Moreover, lubricants or any other contaminations may also fall into the open end of the package before sealing, thereby contaminating or polluting the package and any substance or product contained in the package. This gives a lower quality concerning hygienic requirements for the package and the apparatus.

Another problem is that the movable parts are difficult to disassemble or dismount from each other due to a complicated structure, whereby any maintenance and cleaning of the sealing apparatus are difficult and time-consuming creating a higher cost per package and/or product and a shorter working life for the apparatus.

SUMMARY OF THE INVENTION

The main objects of the present invention are to fold and seal packages by using a novel sealing apparatus and a novel method of operating the sealing apparatus with a simpler, faster, more hygienic, and more reliable transversal folding and sealing of the packages.

These objects are achieved by an apparatus for sealing a package having an open end, the apparatus comprising at least one pair of halves, which are reciprocally movable between an open position and a closed sealing position for sealingly closing the open end of the package. The apparatus further comprises forming means comprising a pair of forming flaps, each forming flap being associated with a sealing half and pivotally attached at a first end to a support such that a second end of each forming flap is adapted to at least partly follow the reciprocal movement of the associated sealing half, and in that the forming flaps during the movement of the sealing halves towards the closed sealing position press two opposing portions of the package towards each other.

Moreover, these objects are achieved by a method for sealing a package, which method uses the above-mentioned apparatus. The method comprises the steps of providing the apparatus with forming means comprising a pair of forming flaps, setting the apparatus in a first open package-receiving position, supplying a package to the apparatus, associating each forming flap with a sealing half of at least one pair of reciprocally movable sealing halves, moving the at least one pair of reciprocally movable sealing halves of the apparatus towards and into contact with the package, pressing two opposing portions of the package towards each other by means of the pair of forming flaps during the movement of the at least one pair of reciprocally movable sealing halves, biasing the at least one pair of sealing halves further by pressing against opposing portions of the package, thereby folding the opposing portions of the package, and sealing the package by supplying energy to the at least one pair of reciprocally movable sealing halves.

By providing a packaging apparatus with a sealing apparatus according to the invention and operating the sealing apparatus by the suitable above-mentioned method, the following main advantages are obtained: the folding and sealing of each package are performed more accurately and easier, thereby reducing adjustment time and giving increased productivity; cleaning of the sealing apparatus is performed easier, faster, and better, whereby the package and its content are kept sterilized creating a higher shelf-life for the package and its contained substance; and, the sealing apparatus is easier to disassemble or dismount and maintain, thereby also giving increased productivity.

In a preferred embodiment each of the forming flaps is adapted to be pivoted from a first essentially vertical position to a second angled position in which the second end is in contact with a portion adjacent the open end of each package.

In another preferred embodiment of the above-mentioned apparatus the forming flaps is biased, such that it is kept in its first essentially vertical position when the sealing halves are in their open position.

In a further preferred embodiment the apparatus comprises at least three pairs of linkage arrangements including a first pair of linkage arrangements with two reciprocally movable halves provided with pressing means for pressing on opposing portions of the package at a distance from the open end thereof, a second pair of linkage arrangements with two reciprocally movable halves provided with forming means for forming each package adjacent the open end thereof, and a third pair of linkage arrangements with two reciprocally movable halves provided with sealing means for closing and sealing the open end of each package.

Preferably, each of the forming flaps is attached at its first end to one end of each half of the second pair of linkage arrangements between the third pair of linkage arrangements and the second pair of linkage arrangements.

Preferably, the forming flaps is biased by means of a spring, which is operatively connected to the first end of each of the forming flaps.

In a preferred embodiment each of the forming flaps is attached at its first end to an upper side of each half of the second pair of linkage arrangements.

Preferably, each of the forming flaps is generally T-shaped and oriented such that the second end of the flap forms the overhead horizontal leg of the T.

In a preferred embodiment the three pairs of linkage arrangements for sealingly closing the open end of each package are vertically spaced apart, so that the movable halves of the linkage arrangements are freely movable in relation to each other during sealing and closing of each package.

In a further embodiment the third pair of linkage arrangements with two halves provided with sealing means for sealingly closing the open end of each package is placed at a vertical distance from each half of the second pair of linkage arrangements, which vertical distance is adapted so that the flap is pivoted by the two halves of the third pair of linkage arrangements from its first essentially vertical position to its second angled position for pressing two opposing portions of the package towards each other.

In yet a further embodiment the first pair of linkage arrangements is connected to a first carrier movably provided on a guide, the second pair of linkage arrangements is connected to a second carrier movably provided on said guide, the third pair of linkage arrangements is connected to a third carrier movably provided on said guide, and the carriers are connected to a cam curve disc.

In yet an additional embodiment each half of the first pair of linkage arrangements comprises an arm which in a first end is provided with the pressing means for pressing on a portion of the package at a distance from the open end thereof and which in a second end is pivotably connected to the first carrier by a link, and which between the first and second ends is provided with a fixed pivot point.

In a further embodiment each half of the second pair of linkage arrangements comprises a first and a second arm, which first and second arms being connected to each other in first ends thereof and provided with the forming means for forming each package adjacent the open end thereof, which first arm in a second end is pivotably connected to the second carrier by a link and which between the first and second ends is provided with a fixed pivot point, and which second arm in a second end is fixed and which in between the first and second ends is provided with a fixed pivot point. This geometry of the second linkage arrangements give rise to a "wave"-like motion of the forming means when they are moved towards and from the package, i.e. the the ends of the linkage arrangements which are provided with the forming means will make a tilting motion during the movement. The tilting is accomplished in that the first end of the first arm during a part of the movement moves to a position which is lower than the position of the first end of the second arm, seen in relation to the package fin created during sealing. The tiliting motion takes place in the end of the movement towards the package and in the beginning of the movement from the package. This "wave"-like motion of the forming means is advantageous in that it minimises the risk of damaging a portion of the package near the seal, i.e. near the fin, for example the triangular corner flaps present in many known carton packages. This is especially useful when the forming means are moved from the package since the package has then been sealed and is less flexible due to the rigid fin.

In yet a further embodiment each half of the third pair of linkage arrangements comprises an arm which in a first end is provided with the sealing means for closing and sealing the open end of each package and which in a second end is pivotably connected to the third carrier by a link, and which between the first and second end is provided with a fixed pivot point.

Preferably, the third carrier is connected to the cam curve disc via a fourth carrier. The fourth carrier is connected to the third carrier via an actuation member, which actuation member is adapted to change the mutual distance between the third and fourth carriers along the guide for biasing the sealing means for closing and sealing the open end of each package. By providing an actuation member an additional sealing force is obtained which further secures the creation of a satisfactory seal.

Preferably, the fixed pivot point of the first arm is arranged substantially at the same distance from the forming means in a vertical direction as the fixed second end of the second arm, so that the pivotable portion of the first arm is longer than the pivotable portion of the second arm.

Advantageously, the fixed pivot point of the arm of each half of the first linkage arrangements and the fixed pivot point of the arm of each half of the third linkage arrangement are arranged substantially at the fixed pivot point of the first arm and the fixed second end of the second arm of each half of the second linkage arrangements in the vertical direction. By providing an apparatus with the above-mentioned features further advantages, in addition to the above-mentioned advantages, are obtained. The carriers and the cam curve, being the drive equipment, can be separated from the sealing equipment by for example a middle section. By providing the above-mentioned substantially "coinciding" points (fixed point, pivot points etc) in or near the middle section only few pivot points will be present in the area near the package. Thus, the risk of disturbing the air flows provided to keep the package and its content sterilized is minimized and any dirt from the drive equipment can be shielded from the area near the package. This is an advantage when the package content is exceptionally sensitive.

BRIEF DESCRIPTION OF THE DRAWINGS

The present invention will now be described in more detail with reference to the enclosed drawings, in which.

DETAILED DESCRIPTION OF PREFERRED EMBODIMENTS

Figure 1:
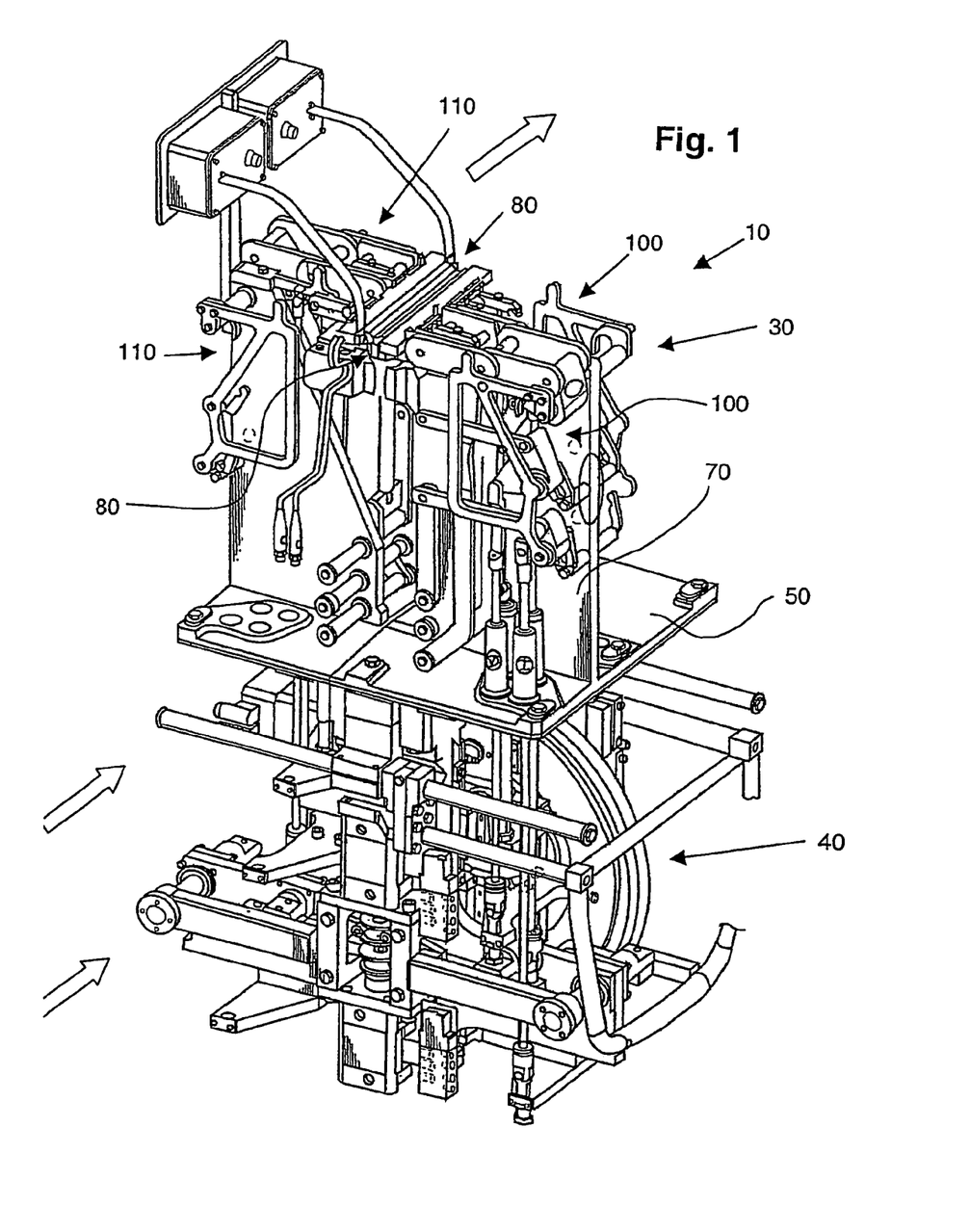
FIG. 1 schematically shows a general assembly of an apparatus according to a first embodiment of the invention to be mounted in a packaging machine (not shown), FIG. 2 schematically shows an assembly of linkage arrangements in an apparatus according to a second embodiment of the invention in an open package-receiving position, FIG. 3 schematically shows a first pair of linkage arrangements according to the embodiment shown in FIG. 2, FIG. 4 schematically shows a second pair of linkage arrangements according to the embodiment shown in FIG. 2, FIG. 5 schematically shows a third pair of linkage arrangements according to the embodiment shown in FIG. 2, FIG. 6 schematically shows a first pair of linkage arrangements according to the first embodiment shown in FIG. 1, FIG. 7 schematically shows a second pair of linkage arrangements according to the first embodiment shown in FIG. 1, FIG. 8 schematically shows a third pair of linkage arrangements according to the first embodiment shown in FIG. 1, FIG. 9 schematically shows a view of a pivotable T-shaped device facilitating the sealing of packages from a first angle, FIG. 10 schematically shows a view of the pivotable T-shaped device in FIG. 6 from a second angle, and FIG. 11 schematically shows a plan view of the pivotable T-shaped device in FIGS. 6 and 7 from another angle.

FIG. 1 shows an apparatus 10 for sealing packages 20 (not shown) according to a first embodiment of the present invention. This apparatus 10 is to be mounted as a part of a larger packaging machine (not shown), which fills packages 20 with products or substances, preferably food or beverages but could be any other suitable substance, then closes and seals the packages using the sealing apparatus 10 by folding an open end 20a of each package, thereby closing the open end and sealing the fold, and subsequently delivers the packages to a final folding station (not shown). The packages are transported into the sealing apparatus 10 from left to right in FIG. 1 and out of the sealing apparatus after being sealed according to the three arrows in FIG. 1, two arrows to the left in FIG. 1 and one arrow to the right in FIG. 1. The large packaging machine and its function will not be explained in more detail in this description because its function and structure is common knowledge for a skilled person.

Figure 9:
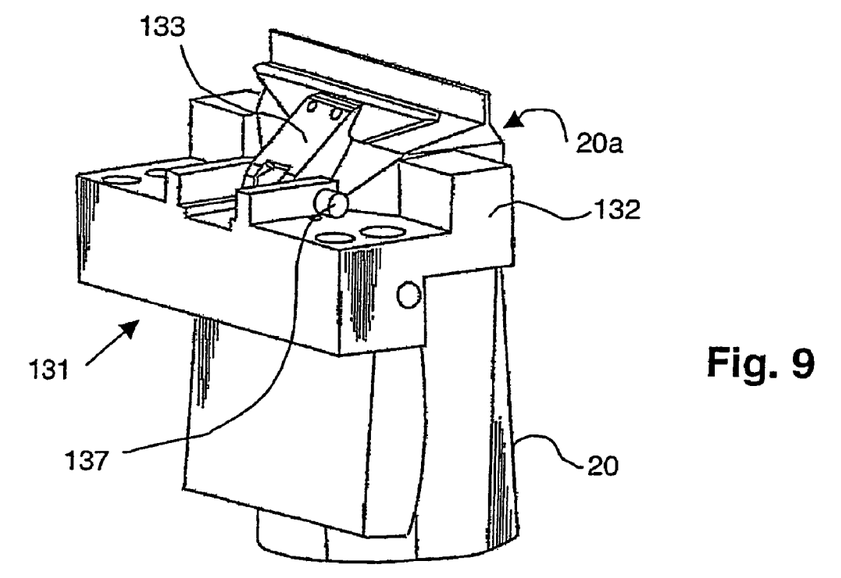

Each of the packages 20 are handled upside down and transported into the sealing apparatus 10, each package has its first open bottom end 20a, see FIG. 9, pointing upwards in the vertical direction and a second top end (not shown) pointing downwards in the vertical direction.

FIG. 1 illustrates a general assembly of a first embodiment of the invention showing all the parts, equipments and arrangements required for the operation of the sealing apparatus 10 except for the means required for connecting and fastening the sealing apparatus to the large packaging machine (not shown).

The sealing apparatus 10 shown in FIG. 1 comprises two primary sections, a first upper section 30 with an equipment for sealing the packages 20 and a second lower section 40 with a driving or operation equipment for operating or actuating, i.e. move the sealing equipment. The upper section 30 and the lower section 40 are separated by a middle section 50 of a frame 70 forming a partition.

The object of the middle section 50 separating the sealing equipment from the drive equipment is to ensure that the packages 20, and, more specifically, the open end 20a of each package and the content, i.e. the air and substance or fluid contained in the package, are kept clean, hygienic, and sterilized by not being exposed to any contaminations created by the drive equipment, e.g. lubricants, dust, dirt, or even solid particles created by wear between the moving parts of the drive equipment, which particles otherwise could end up in the packages by being transported, in this case, first upwards and then into the packages (not shown).

The packages 20 are kept hygienic and sterilized by supplying a sterile air flow constantly downwards from the top of the sealing apparatus 10 in FIG. 1 through the apparatus and out adjacent the middle section 50, so that any contaminations are kept away from each package and its open end 20a and urged out with the sterile air flow out of the sealing apparatus, this is also facilitated by the structure of the sealing apparatus because all of the lubricants and most of the moving metal parts are placed below the packages 20, or more specifically under the middle section 50 of the frame 70.

The sealing apparatus 10 seals at least two packages 20 at a time when operating in this embodiment and therefore the upper sealing equipment shown in FIG. 1 uses two pairs of sealing devices 80 each pair having two movable mirror-inverted arrangements 100 and 110 in the form of link systems. This adds up to two link systems 100 to the right in FIG. 1 and two link systems 110 to the left in FIG. 1. Here, in FIG. 1, only one half 100 of the two movable mirror-inverted link systems 100 and 110 in the nearest sealing device pair 80 is shown in its entirety to the right for clarity reasons. The other nearest link system half 110 to the left is only partly shown, i.e. only the parts directly engaging each package 20 (not shown) are shown. Each pair of sealing devices 80 is attached to the frame 70, the nearest pair in FIG. 1 is attached at one side of the frame and is more clearly seen, the other pair is attached on the other side of the frame 70. It should be understood that the pair of sealing devices 80 beyond the first pair operates and is actuated and constructed in the same manner as the first nearest pair of the sealing devices 80 and will therefore not be explained in detail.

Each of the four link systems 100 and 110 being partly and/or entirely shown in FIG. 1 has three pairs of armlike or leglike linkage arrangements. In the following, these linkage arrangements will first be described according to a second embodiment of the invention, which second embodiment is substantially similar to the first embodiment except for the design of the linkage arrangements and the drive equipment.

Figure 2:
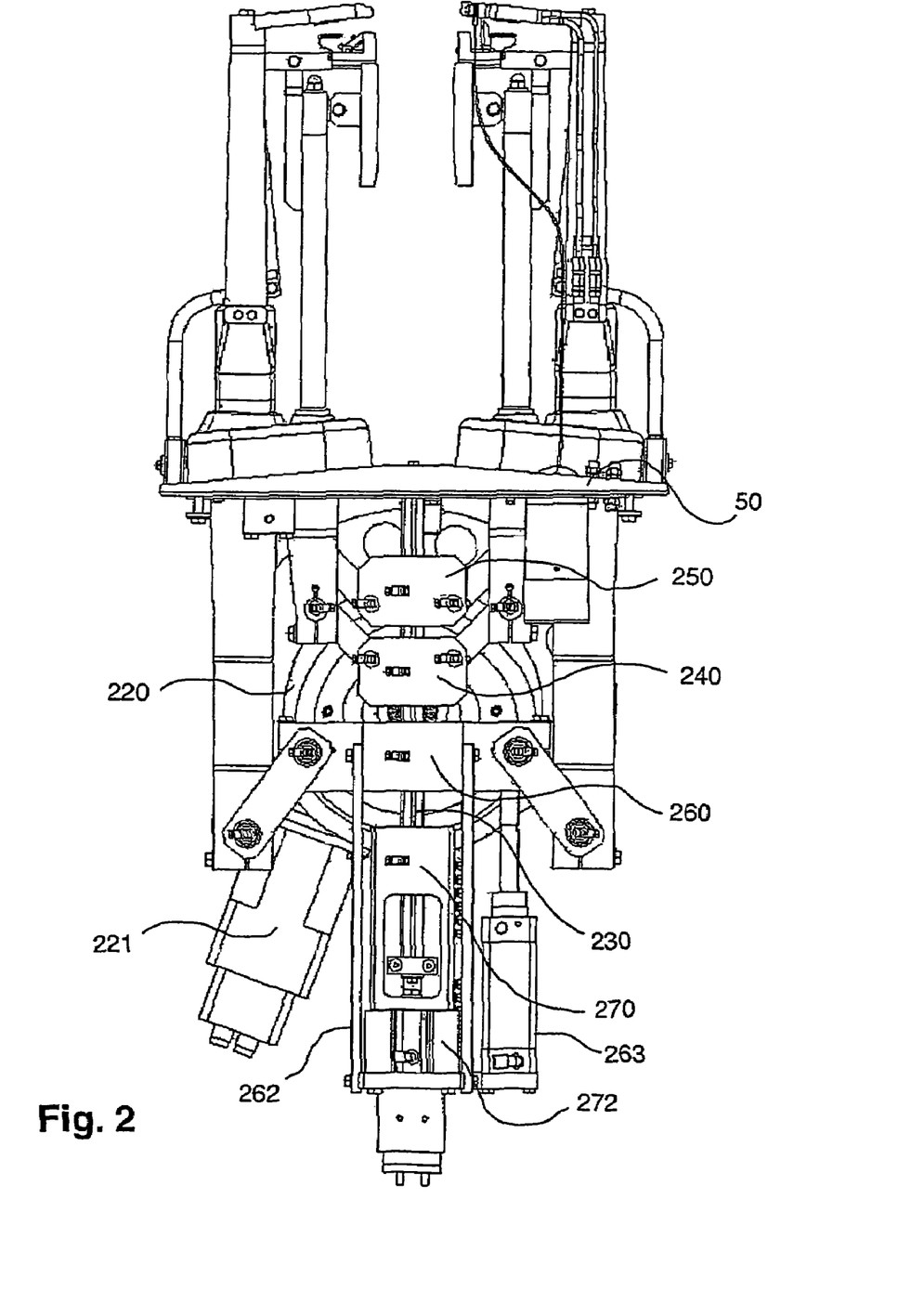
Figure 3:
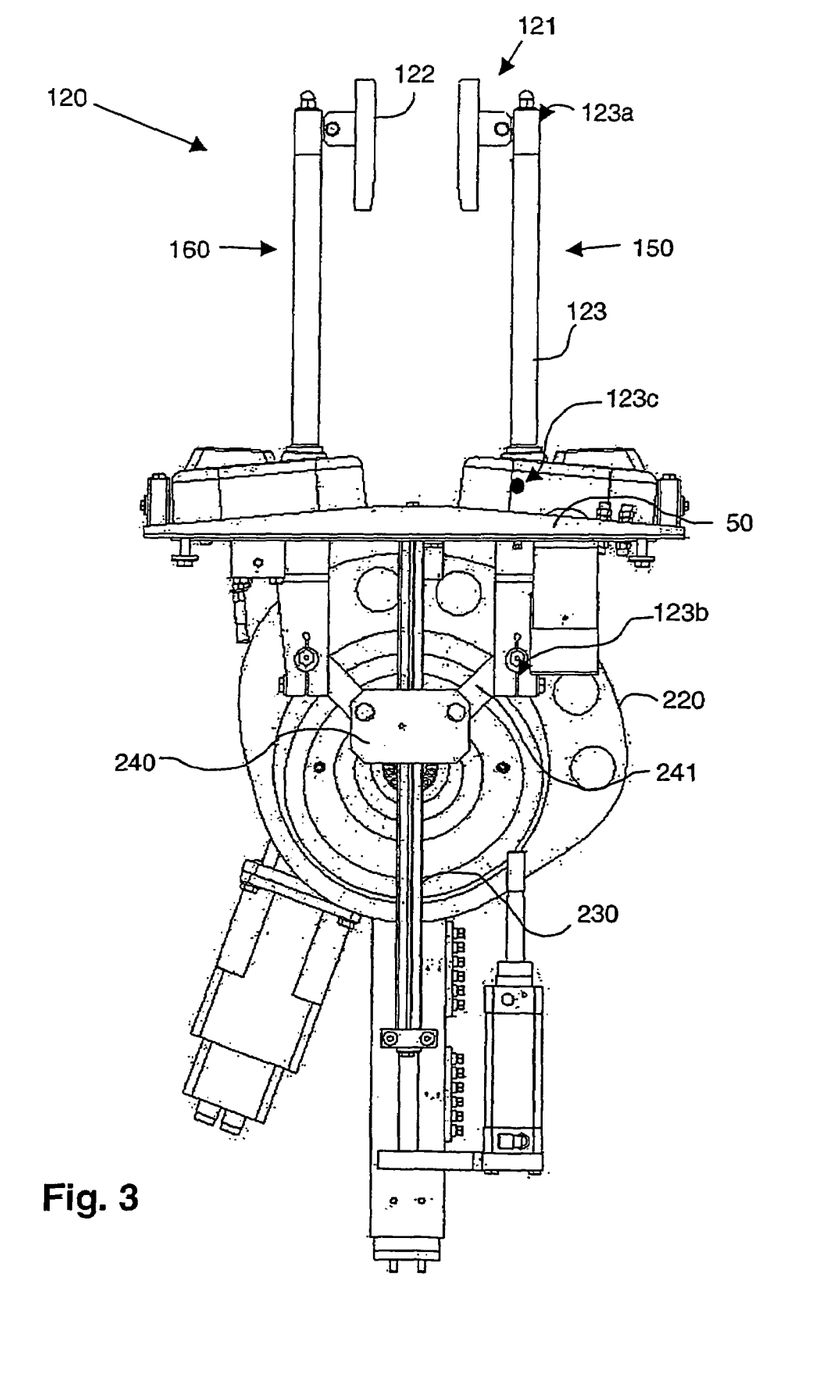
Figure 4:
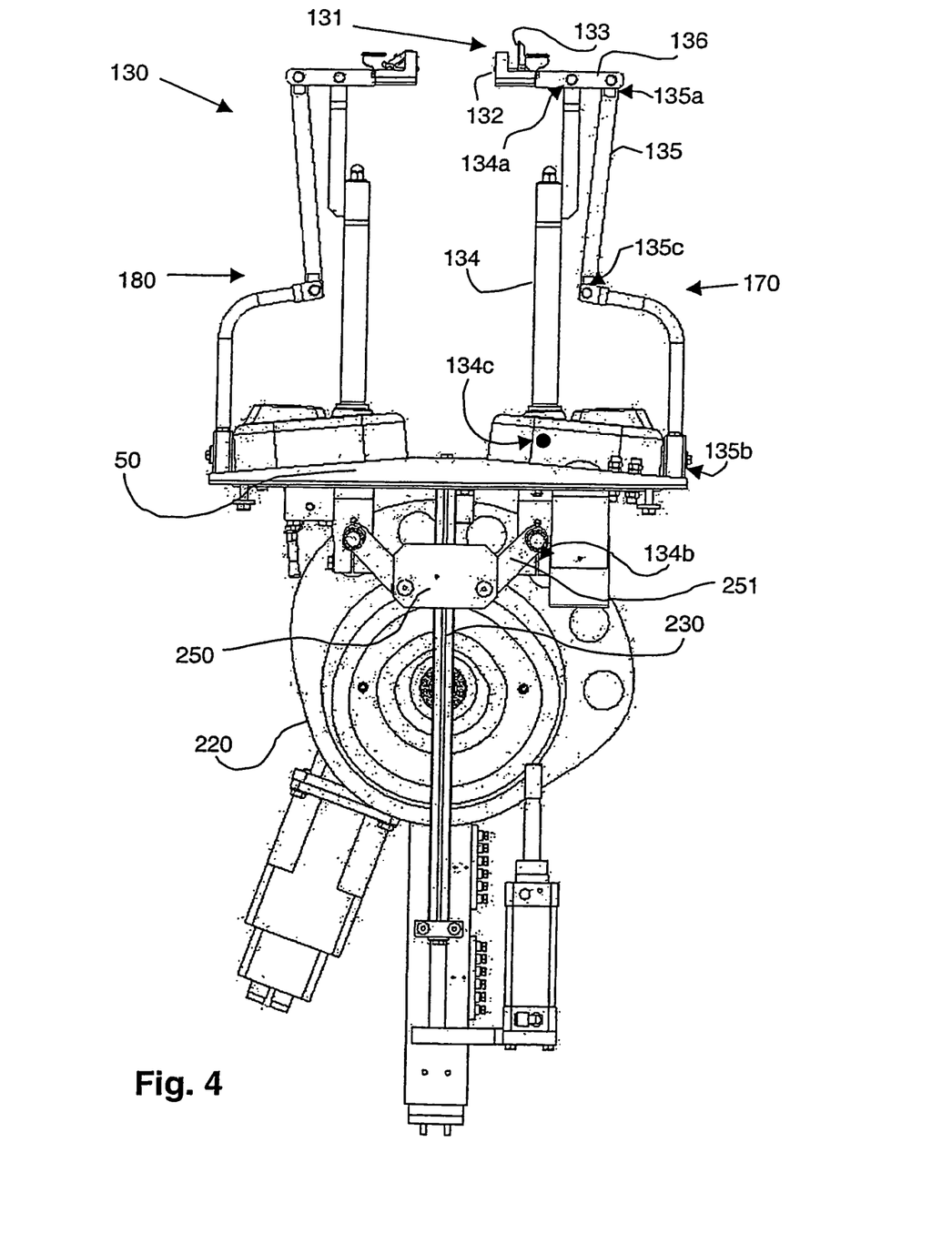
Figure 5:
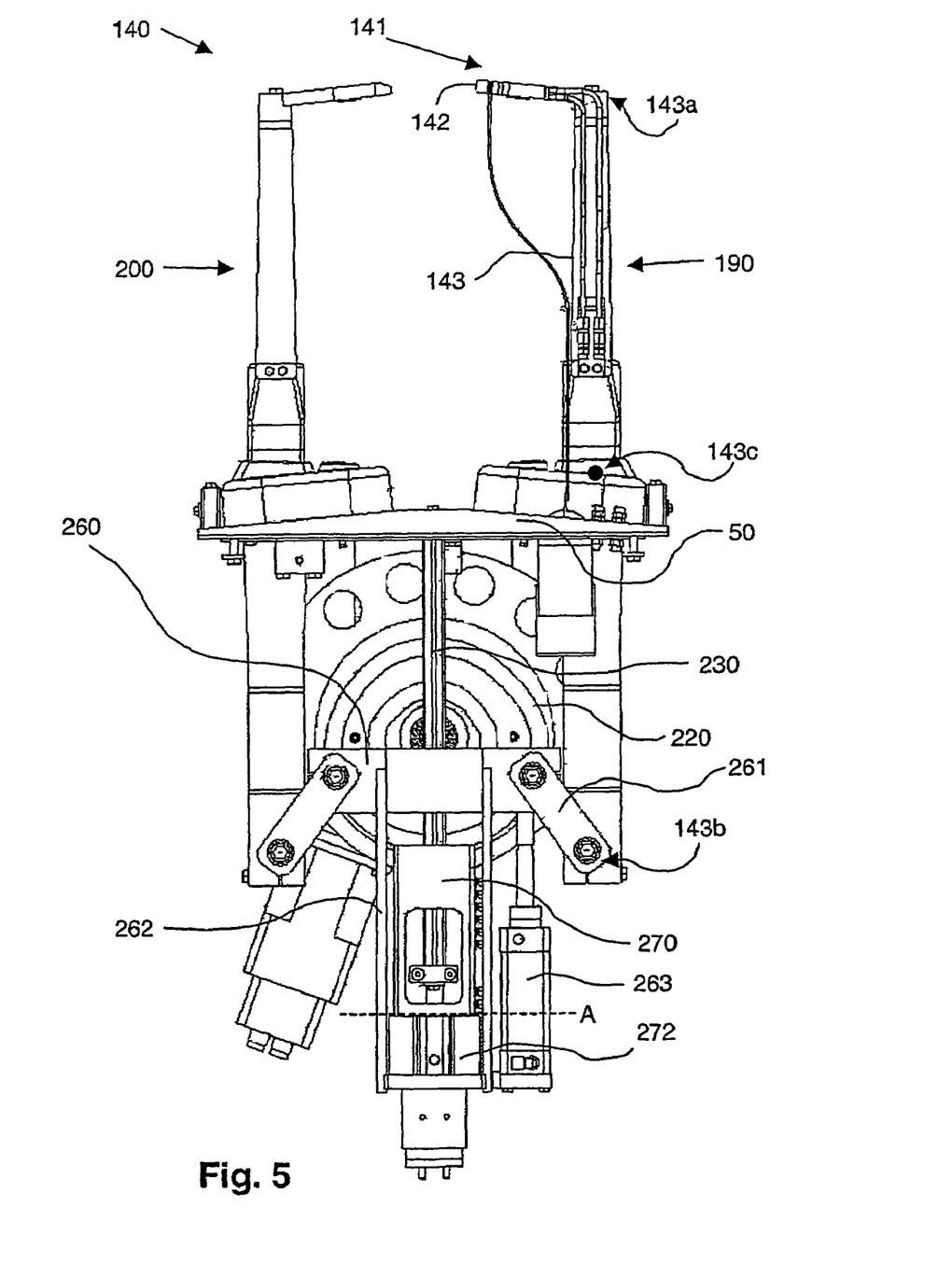

FIG. 2 shows an assembly of the three linkage arrangements and FIG. 3-5 show them separately. Each of these pairs of linkage arrangements has different functions. The first pair of linkage arrangements, denoted 120 and shown in FIG. 3, is provided with pressing means 121 for pressing on opposing portions of the package 20 at a distance from the open end 20a thereof and will hereinafter be referred to as a headspace device. The function of the headspace device 120 is to control the filled volume in the headspace of each package 20. The second pair of linkage arrangements, denoted 130 and seen in FIG. 4, is provided with forming means 131 for forming each package adjacent the open end 20a thereof, and will hereinafter be referred to as a forming tool. The third pair of linkage arrangements, denoted 140 and shown in FIG. 5, is provided with sealing means 141 for closing and sealing the open end 20a of each package 20.

The first pair of linkage arrangements 120, i.e. the head space device 120 comprises two halves both shown in FIG. 3, a first right head space half 150 and a first left head space half 160 for controlling the filled volume in the headspace of each package 20 by pressing each package 20 at a distance from the open end 20a. The two halves 150, 160 are placed opposite each other and the only difference between the two halves are that the left half 160 is mirror-inverted in relation to its opposite right half 150. When describing the head space device only the right half will be described. The right first head space half 150 of the head space device 120 comprises a package engaging member 122.

The second pair of linkage arrangements 130, i.e. the forming tool, is shown in FIG. 4 and comprises a first right forming tool half 170 and a first left forming tool half 180, the first left forming tool half 180 of the forming tool 130 is placed opposite the first right forming tool half 170 and the only difference between the two opposite halves 170, 180 is that the left half 180 is mirror-inverted in relation to its opposite right half 170. When describing the forming tool only the right half will be described. The right first forming tool half 170 of the forming tool 130 comprises first and second package engaging members 132, 133. The function of the forming tool 130 and these package engaging members 132, 133 will be described in detail later in this description.

The third pair of linkage arrangements 140 is shown in FIG. 5 and comprises a first right sealing jaw half 190 and a first left sealing jaw half 200, which are placed opposite each other. The right first sealing jaw half 190 of the sealing jaw 140 comprises a package engaging member 142 for sealing the package 20. There is a functional and structural difference between the two sealing jaw halves 190 and 200, the difference being that only the first right half 190 actively performs the sealing of each package 20, while, at the same time, the other opposite first left half 200 only works as an anvil during the sealing procedure. This means that the right half 190 is provided with the active sealing means 141 and the opposite left half 200 basically has a shape corresponding to the other right half 190 for ensuring a secure sealing. In this embodiment the sealing method is induction sealing where a radio frequency alternating current is supplied and causes induced currents in a aluminum foil provided in each multi-layer package 20, thereby heating the aluminum foil, which in turn heats a plastic layer in the multi-layer package. Induction sealing is well-known and will not be described in more detail.

Each of the pairs of linkage arrangements 120, 130, and 140 is in communication with, or, more specifically, connected to the drive equipment in the lower section 40 of the apparatus 10 for moving the linkage arrangements 120, 130, and 140 in relation to each other, the sealing apparatus 10 as a whole, and the packages 20 to be sealed. Only the features of the drive equipment that are essential for the understanding of the invention will be described. The drive equipment, see FIG. 2, comprises a cam curve disc 220. An electric motor 221 is connected to a transmission/gear box which in turn drives the cam curve disc 220. Further, the drive equipment comprises a guide 230, preferably in the form of a linear shaft. Said guide 230 is fixed to the middle section 50 of the frame 70 and is provided with a first and a second carrier 240, 250 which is each movably arranged thereon. The guide 230 is further provided with a third and a fourth carrier 260, 270 which are connected to each other via a frame 262 and together movably arranged on the guide 230. The first pair of linkage arrangements 120 is connected to the first carrier 240, the second pair of linkage arrangements 130 is connected to the second carrier 250 and the third pair of linkage arrangements 140 is connected to the pair comprising the third carrier 260 and the fourth carrier 270.

The first, second and fourth carriers 240, 250, 270 each has the function of a cam and each of the first and second carriers is fitted into an associated cam curve (partly shown) in the cam curve disc 220, whereas the fourth carrier 270 is in contact with and follows the outer periphery of the cam curve disc 220 by a roll (not shown). Said roll is held biased by a spring 263 connected to the third carrier 260. Each of the carriers 240, 250 and the pair of carriers 260, 270 are moved relatively each other by rotating the cam curve disc 220 using the electric motor 221 and the transmission box. Upon rotation of the cam curve disc 220 the first, second and fourth carriers 240, 250, 270 will move upwards and downwards along the linear guide 230, in a vertical direction in FIG. 2. Since the third carrier 260 is connected to the fourth carrier 270 it will move uniformly. This will not be described in further detail, since the use and function of a cam curve disc and carriers moving by means of such a cam curve disc is common knowledge for a skilled person.

The second carrier 250 is located at the top of the four carriers, see FIG. 2, the first carrier 240 is located below the second carrier 250, the third carrier 260 is located below the first carrier 240 and the fourth carrier 270 is located at the bottom, i.e. below the third carrier 260.

If the first or the second carrier 240, 250 is moved upwards in FIG. 2, each associated package engaging part of the head space device 120 or the forming tool 130 is moved into contact/engagement with the package 20 to be sealed, and if the first or the second carrier 240, 250 is moved downwards to the position shown in the figures, each associated package engaging part of the head space device 120 or the forming tool 130 is moved away from the package 20. If the fourth carrier 270 is moved downwards, thereby moving also the third carrier 260 (which acts as a slave) downwards, each associated package engaging part of the sealing jaws 140 is moved into contact/engagement with the package 20 to be sealed, and if the fourth carrier 270 is moved upwards to the position shown in FIG. 2 or 5, thereby moving the third carrier 260 upwards, each associated package engaging part of the sealing jaws 140 is moved away from the package 20. How this is accomplished will now be described.

Each half 150, 160 of the first pair of linkage arrangements 120 comprises an arm 123, see FIG. 3. The pressing means 121, with the package engaging member 122, for pressing on a portion of the package 20, is arranged to an upper, first end 123a of the arm 123. Preferably, the package engaging member 122 is pivotably arranged to be able to smoothly press on the package 20. A lower, second end 123b of the arm 123 is pivotably connected to the first carrier 240 by a link 241. Between the first and second ends 123a, 123b a fixed pivot point 123c is provided (not shown, but marked with a dot in the figure). The pivot point 123c connects the arm 123 to the frame 70 and in this embodiment the pivot point 123c is located at the middle section 50 so that it is shielded from the package area by for example bellows.

Each half 170, 180 of the second pair of linkage arrangements 130 comprises a first and a second arm 134, 135, see FIG. 4. Each arm 134, 135 has a first end 134a, 135a and these two respective first ends 134a, 135a are fixedly connected to each other by a link 136 to which the forming means 131 with the first and second package engaging members 132, 133 are arranged. A second end 134b of the first arm is pivotably connected to the second carrier 250 by a link 251. Further, there is provided a fixed pivot point 134c (not shown, but marked with a dot in the figure) between the first and second ends 134a, 134b of the first arm 134. The pivot point 134c connects said first arm 134 to the frame 70 and in this embodiment the pivot point 134c is located at the middle section 50 so that it is shielded from the package area by for example bellows. A second end 135b of the second arm 135 is fixed. Preferably, it is fixed to the middle section 50. However, a fixed pivot point 135c is provided in between the first and second ends 135a, 135b of the second arm 135. Thus, the upper portion of the second arm 135 is pivotable. As can be seen in the figure the first and second arms 134, 135 of each half of the second linkage arrangements 130 are arranged so in relation to each other that the fixed pivot point 134c of the first arm 134 is arranged substantially at the same distance from the forming means 131 in a vertical direction as the fixed second end 135b of the second arm 135. Thus, the pivotable portion of the first arm 134 is longer than the pivotable portion of the second arm 135. As can be understood from FIG. 4, the geometry of the second linkage arrangements 130 give rise to a "wave"-like movement of the forming means 131 when they are moved towards and from the package 20 (not shown in FIG. 4). This will be described in more detail further on.

Each half of the third pair of linkage arrangements 140 comprises an arm 143 which in a first end 143a is provided with the sealing means 141 for closing and sealing the open end of each package 20, see FIG. 5. A second end 143b of said arm 143 is pivotably connected to the third carrier 260 by a link 261. Further, the arm 143 is provided with a fixed pivot point 143c (not shown, but marked with a dot in the figure) between the first and second end 143a, 143b. The pivot point 143c connects the arm 143 to the frame 70 and in this embodiment the pivot point 143c is located at the middle section 50 so that it is shielded from the package area by for example bellows.

As can be seen in the figures the fixed pivot point 123c of the arm 123 of each half of the first linkage arrangements 120 and the fixed pivot point 143c of the arm 143 of each half of the third linkage arrangement 140 are arranged substantially at the fixed pivot point 134c of the first arm 134 and the fixed second end 135b of the second arm 135 of each half of the second linkage arrangements 130 in the vertical direction.

Advantageously, each of the total of four arms 123, 134, 135, 143 is made of metal, preferably, alloy steel that fulfills the hygienic requirements of the present invention, e.g. a sufficient durability against cleaning detergents, acids and bases.

Figure 6:
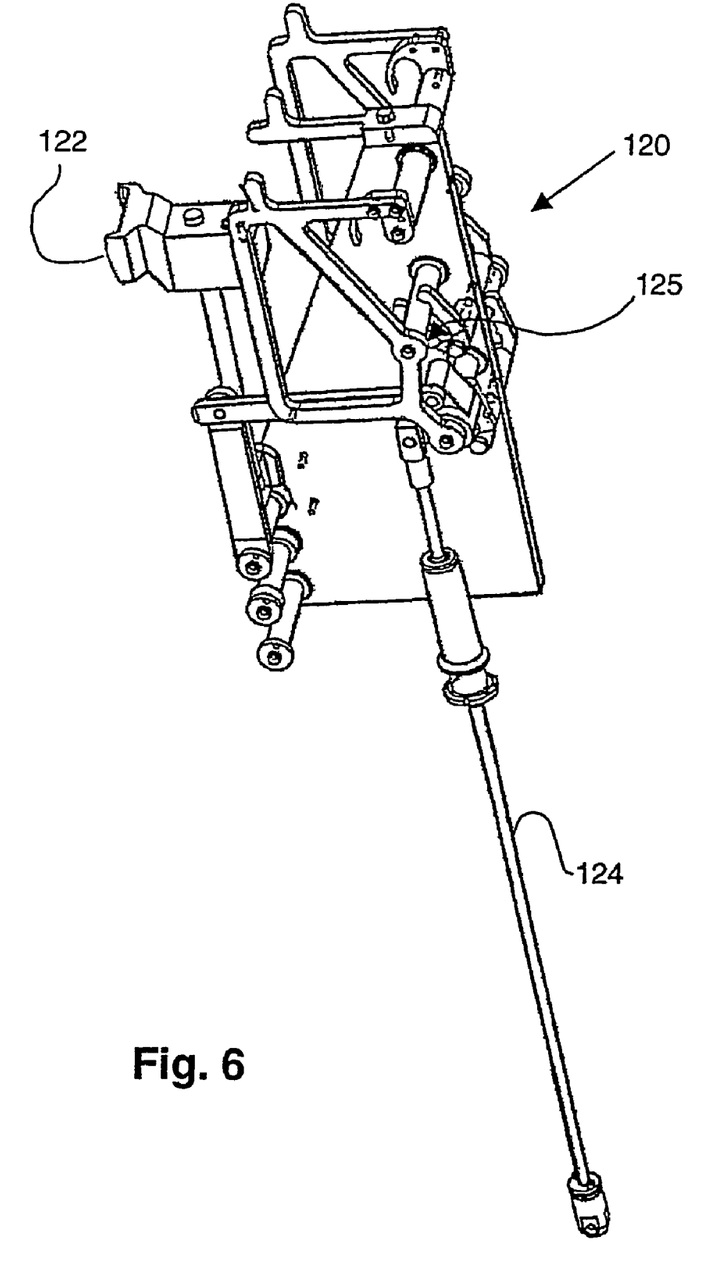
Figure 7:
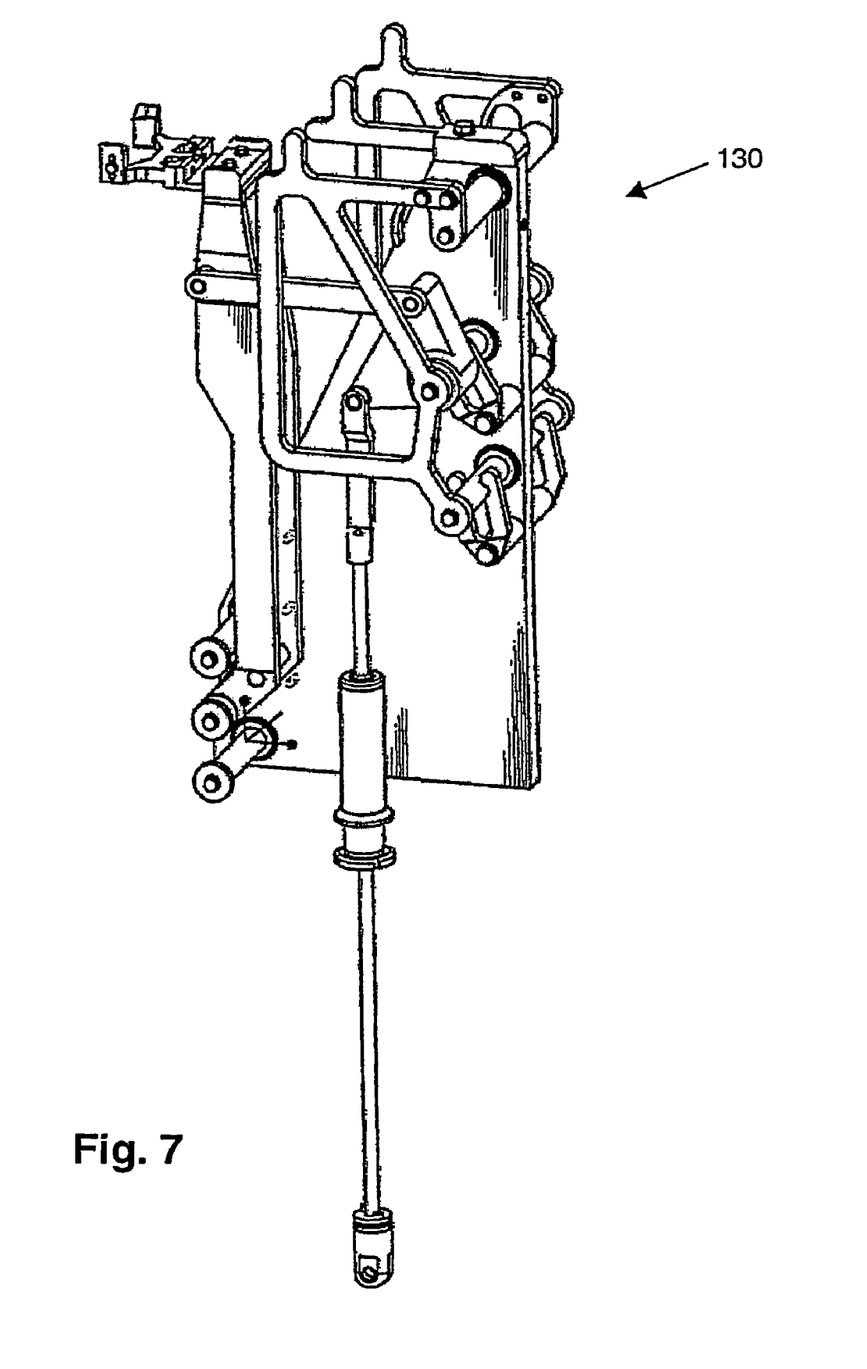
Figure 8:
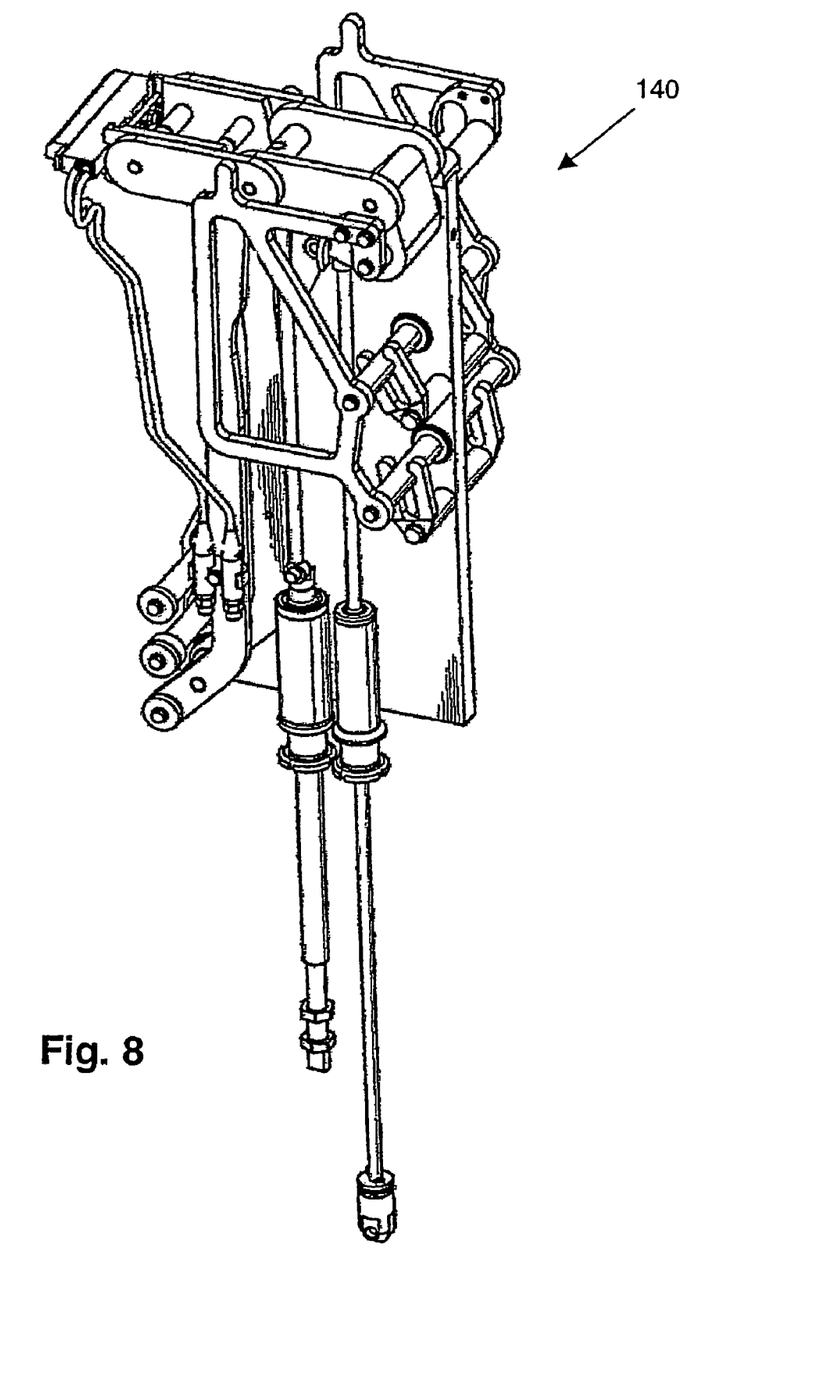

The above described linkage arrangements 120,130, 140 can have alternative designs and one such alternative design is shown in the second embodiment of the invention and can be seen in FIG. 6-8. When describing the linkage arrangements 120, 130,140 of the second embodiment similar features will be denoted with the same reference numerals. The linkage mechanisms are here located in the upper section 30 of the apparatus 10 and actuated by tie rods. The package engaging member 122 of the head space device 120, see FIG. 6, is actuated by a tie rod 124 which is connected to a parallelogram linkage system 125. The linkage arrangements of the forming tool 130 and the sealing jaw 140 are designed in similar ways and can be seen in FIGS. 7 and 8 respectively. For the sealing jaws 140 two tie rods are used.

In the following, and with reference to FIGS. 9-11, the first and second package engaging members 132, 133 of the forming means 131 will be described. The first package engaging member 132 has the form of a U-shaped grip member that is adapted to grasp each package 20 from the opposite side in relation to the other corresponding opposite first package-engaging member. The second package engaging member 133 is a forming flap. The forming flap 133 is a T-shaped (wing like) device, and since it is very similar to a flap for facilitating the forming and folding of each package 20 it is denoted as a forming flap. Here, only one wing like device or forming flap 133 is illustrated and rotatably attached with a first end 133a, the vertical member, i.e. the vertical leg of the T, to each of the two forming tool halves 170 and 180. One forming flap 133 is attached against one end, i.e. an upper side of the first right forming tool half 170 and one forming flap 133 is attached against an upper side of the first left forming tool half 180 (not shown). The second end 133b of the T-shaped flap 133 is the overhead horizontal leg of the T. The function of this pair of forming flaps 133 will only be explained with reference to one device because the other works and moves in a similar mirror-inverted way.

The forming flaps 133, in the vertical direction, as seen in FIG. 2, are placed between the third pair of linkage arrangements, i.e. the sealing jaw 140, and the second pair of linkage arrangements, i.e. the forming tool 130. The reason for this is to ensure that the movable halves 150, 160,170,180, 190, 200 of the linkage arrangements, i.e. the head space device 120, the forming tool 130, and the sealing jaw 140 are freely movable in relation to each other during sealing and closing of each package 20.

Figure 10:
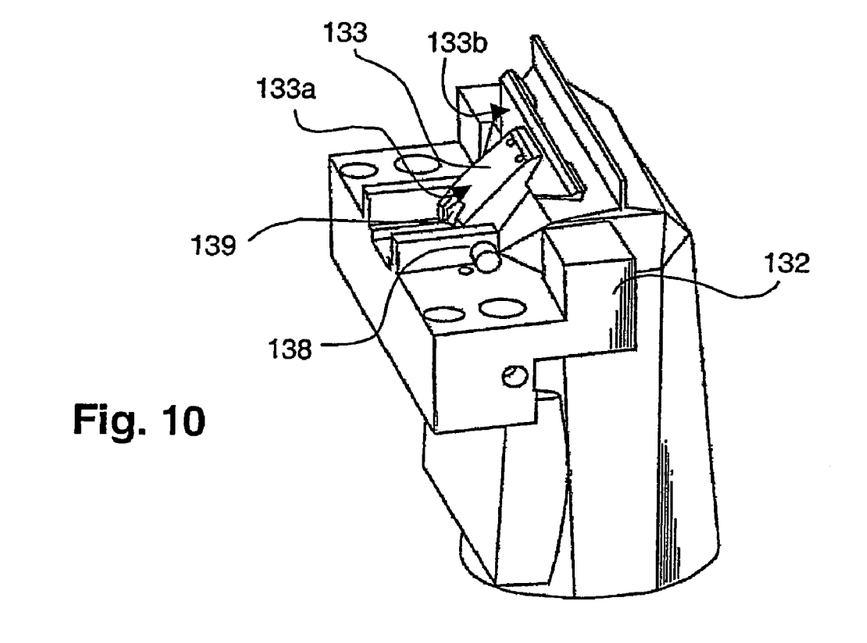
Figure 11:
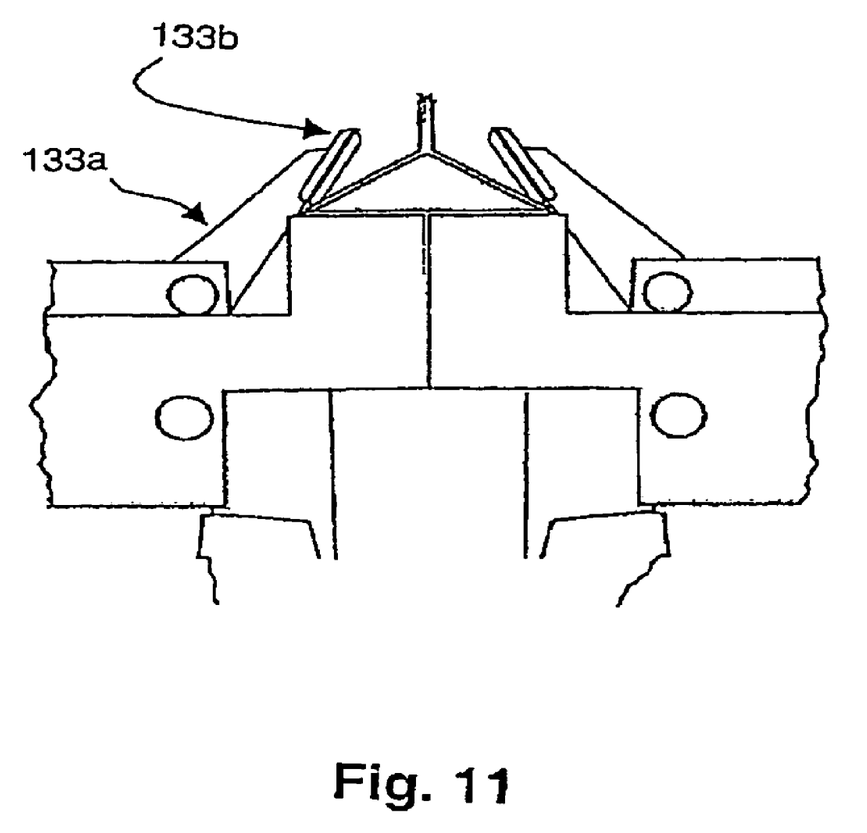

The forming flap 133 shown in FIGS. 9-11 is slightly biased, in the non-operating or non-sealing state, i.e. when the sealing jaws 190, 200 is in a first open position, in an essentially vertical direction upwards, by means of a wing pin 137 protruding through attachment holes 138 in each upper side of the forming tool halves 170 and 180, and being provided with resilient biasing means in the form of at least one spring 139, e.g. a helical spring or a plate spring. The forming flap 133 is adapted to be rotated, or, more specifically, pivoted from a first essentially vertical position (not shown) into a second angled position with the second end 133b in contact with a portion of each package 20, i.e. when the sealing jaws 190, 200 is in a second closed position for sealingly closing each package 20.

The three pairs of linkage arrangements 120, 130,140 shown in FIG. 2 for sealing each package 20 are placed on a vertical distance from each other so that the moving parts, i.e. the movable halves 150, 160, 170,180,190, 200 in the pairs, do not collide when moved during operation of the sealing apparatus 10.

The third pair of linkage arrangements 140, i.e. the sealing jaw, with the two halves 190, 200 for sealing each package 20 is placed on a vertical distance from the upper side 170a, 180a of each half 170,180 of the second pair of linkage arrangements 130, i.e. the forming tool, which vertical distance is adapted so that the forming flap 133 is moved by the two halves 190, 200 contacting/engaging the flap 133 from its first essentially vertical position into its second angled position by being rotated towards and into contact with the package 20 to be sealed. This means that the wing like flap 133 on either of the two forming tool halves 170 or 180 is pushed from its first essentially vertical position (not shown) from the left in FIG. 11 to the right towards the package 20, the same goes for the opposite placed wing like flap on the opposite forming tool half 170 or 180. The rotation of the flap 133 into contact with the open end 20a of the package 20 means that the flap 133 presses at two opposing sides of the package 20 towards each other because the forming tool 130 grips/holds the package adjacent its open end 20a. The flap 133 is placed between the sealing jaws 140 and the forming tool 130.

The fourth carrier 270 is connected to the frame 262 by an actuation member 272 which in this example is a cylinder, preferably a pneumatic cylinder, see FIG. 2. The function of this cylinder 272 is to move the third carrier 260 along the linear guide 230 to provide an additional biasing of the two sealing jaw halves 190 and 200 against each other during the sealing moment. Thereby, some of the sealing force will be provided by the cam curve disc 220, although most of the sealing force will be provided by the cylinder 272 so that the sealing of a transversal joint at the bottom of each package 20 is ensured in a sufficient way. This procedure/function will be explained in more detail later in this description.

Now, the function of the sealing apparatus 10, a method of operating it according to the invention and the operation and movements of the sealing devices 80 will be explained in more detail. All of the sealing devices 80, i.e. the operation and movements of the two pairs of head space devices 120, the two pairs of forming tools 130, and the two pairs of sealing jaws 140 and their associated two halves 150, 160, 170, 180, 190, 200 will be explained with reference to only one pair of head space devices 120, forming tools 130, and sealing jaws 140.

The sealing apparatus 10 has a first primary position, i.e. a starting position or an open position, see FIG. 2, which is a standby state for the sealing apparatus 10 just before a package 20 enters the sealing apparatus 10, and a second primary position, i.e. a final position for sealing and closing the package. The second position is not shown. The open position is defined in the following way: the sealing jaw 140 is open, i.e. the two sealing jaw halves 190, 200 are positioned in their position farthest from each other. This also means that the head space device 120 and the forming tool 130 and their halves 150, 160, 170, 180, respectively, are in corresponding positions in relation to each other, and that the first and second carriers 240, 250 also are in their lowest positions in relation to the figure. The links 241 and 251 are thereby directed slightly upwards. The fourth carrier 270, and thereby the third carrier 260, are in their highest positions in relation to the figure. The link 261 is thereby directed slightly downwards.

Figure 12:
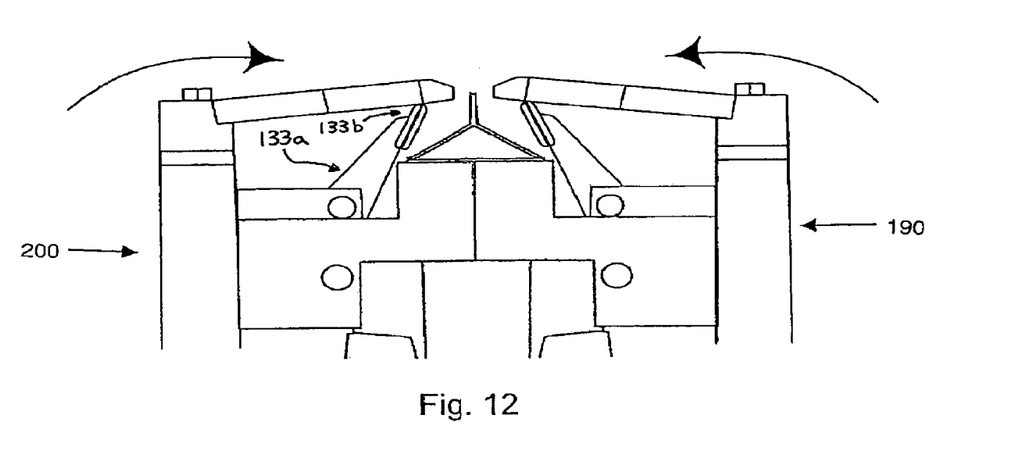
FIG. 12 schematically illustrates, in plan view, the forming flaps being directly pushed by the associated ceiling half.

In this open first primary position for the sealing apparatus 10. a package 20 is supplied into the sealing apparatus. The forming tool 130 with its two halves 170, 180 firstly grips or grasps the package 20 from opposite, i.e. opposing sides or portions by the second carrier 250 being pushed upwards, in relation to FIG. 2, along the linear guide 230 by the associated cam curve for the forming tool 130 in the cam curve disc 220. At the same time, the head space device 120 with its two halves 150, 160 moves towards the package 20 from opposite sides or portions, and, instantaneously makes a stop when touching the package 20, and, then, starts pressing against the package 20 for adjusting the volume contained in the package 20. The movement or pivoting of the head space device 120 is done in the similar way as for the forming tool 130 by the first carrier 240 being pushed upwards, in relation to FIG. 2, along the linear guide 230 by the associated cam curve for the head space device 120 in the cam curve disc 220. Then, the sealing jaw 140 with its two opposite placed sealing halves or jaws 190, 200 is actuated, the halves are also placed opposite each other. The movement or pivoting of the sealing jaw 140 is done in the essentially similar way as for the head space device 120 and the forming tool 130, the main difference is that the third linkage arrangements 140 are actuated by two different means. Firstly, the fourth carrier 270, and thereby also the third carrier 260, are being retracted or pulled downwards, in relation to FIG. 2, along the linear guide 230 by the associated cam curve, which in this case is the outer periphery of the cam curve disc 220. The two sealing jaw halves 190 and 200 are thereby pivoted/moved towards each other and comes into contact with a portion of the vertically pointing second end 133b shown in FIGS. 9-11 of the forming flaps 133 (as generally shown in FIG. 12). When the associated sealing jaw half 190 or 200 passes over the forming flap 133 it pushes the associated forming flap 133 towards the package 20, i.e. the forming flap 133 partly follows the sealing jaw 140. The second ends 133b of the forming flaps 133 and the package engaging members 141 of the associated sealing jaw 140 come into contact with opposing portions or sides of the package 20 and supports/facilitates the folding and forming of the open end 20a of the package 20 during forming and sealing into a closed end. Secondly; the pneumatic cylinder 272 connected to the fourth carrier 270 and the frame 262 provides an additional biasing or pressing of the sealing jaws 140 towards each other. Since the fourth carrier 270 is biased towards the cam curve disc 220, the cylinder 272 presses the frame 262 downwards. This causes the third carrier 260 to move a small additional distance along the linear guide 230 in a direction downwards. Thereby, the mutual distance between the third and fourth carriers 260, 270 along the guide 230 is changed. Also, this creates a gap, corresponding to the additional distance, at line A in FIG. 5. A sealing force is thereby provided and the sealing can be performed. The additional pressing of the sealing jaw halves 190 and 200 a small distance by means of the cylinder 272 facilitates the sealing of the transversal seal.

The movement of the head space device 120 with its two halves 150, 160 are done in a way that the pressing of the package 20 has begun before the sealing halves or jaws 190, 200 comes in contact with the package 20.

The movement of the head space device 120 with its two halves 150,160 are done in a way that the pressing of the package 20 is finished before the movement of the sealing halves or jaws 190, 200 is stopped.

When the sealing is completed, the sealing jaw 140, the forming tool 130, and the head space device 120 are reversed and moved/rotated away from the package 20. Then, or, more specifically, by partly following the reversed movement of the sealing jaw 140, the forming flaps 133 are biased/moved by the spring 139 back to its first essentially vertical position in the standby state or open position for the sealing apparatus 10, which then is ready to receive another new package 20 for another sealing procedure.

As can be understood from the geometry of the second linkage arrangements 130 the forming means makes a "wave"-like motion when they are moved towards and from the package 20. The link 136 connecting the respective first ends 134a, 135a of the first and second arms 134, 135 and to which the forming means are provided makes a tilting motion during part of the movement. The tilting is accomplished in that the first end 134a of the first arm 134 during part of the movement is placed in a position which is lower than the position of the first end 135a of the second arm 135, in relation to the package fin created during sealing. The tiliting motion takes place in the end of the movement towards the package 20 and in the beginning of the movement from the package 20. Thus, when the forming tool 130 is moved away from the package 20 it will not touch it.

Although the present invention has been described with respect to preferred embodiments, it is to be understood that various modifications and changes to the invention may be made without departing from the object and scope of the present invention as defined in the appended claims.

In the embodiments described induction sealing is used. Alternatively, the sealing may also be a so-called ultrasonic sealing, where a ultrasonic oscillation is applied to the packaging material in the package to be sealed such that the hysteresis heats the interface between the materials to be sealed together. Moreover, the sealing could also be a so-called impulse heating where a hot baris put in abutment/ contact with the packaging material such that a plastic material in the interface temporarily at least partly melts and then solidifies creating the sealing. These above-mentioned ways of sealing packages are well-known and will not be explained in more detail.

The sealing apparatus 10 in the embodiments described seals at least two packages 20 at a time but it could of course be sealing more or less than two depending on the production requirements and the available space for the sealing apparatus, whereby only one pair of sealing devices 80 would reduce the size of the apparatus and the production/sealing rate, and more than two pairs of sealing devices 80 would increase the size of the apparatus and the production/sealing rate, as is readily understood by a skilled person.

The invention claimed is:

1. An apparatus for sealing a package having an open end, the apparatus comprising:

at least one pair of sealing halves, both of the sealing halves being reciprocally movable so that the two sealing halves move towards one another from an open position to a closed sealing position and move away from one another from the closed sealing position toward the open position, one of the sealing halves comprising sealing means for sealingly closing the open end of the package when the sealing halves are in the closed sealing position, forming means for forming the package comprising a pair of forming flaps, each forming flap being associated with a respective one of the sealing halves and each forming flap possessing a first end pivotally attached to a support such that each forming flap pivots relative to the sealing means;

each forming flap being directly pushed by the respective sealing half during movement of the respective sealing half towards the closed sealing position to pivotally move each of the forming flaps toward the package to press two opposing portions of the package towards each other.

2. An apparatus according to claim 1, wherein each of the forming flaps is adapted to be pivoted from a first essentially vertical position to a second angled position in which the second end of each forming flap is in contact with a portion adjacent the open end of each package.

3. An apparatus according to claim 2, wherein each of the forming flaps is biased, such that it is kept in its first essentially vertical position when the sealing halves are in their open position.

4. An apparatus according to claim 3, wherein each of the forming flaps is biased by a spring, which is operatively connected to the first end of each of the forming flaps.

5. An apparatus according to claim 1, wherein the apparatus comprises at least three pairs of linkage arrangements including a first pair of linkage arrangements with two reciprocally movable halves provided with pressing means for pressing on opposing portions of the package at a distance from the open end thereof, a second pair of linkage arrangements that include the forming flaps for forming each package adjacent the open end thereof, and a third pair of linkage arrangements that include the one pair of halves which are reciprocally movable between the open and closed positions.

6. An apparatus according to claim 5, wherein each of the forming flaps is attached at its first end to one end of a respective upstanding arm.

7. An apparatus according to claim 5, wherein the three pairs of linkage arrangements for sealingly closing the open end of each package are vertically spaced apart, so that the movable halves of the linkage arrangements are freely movable in relation to each other during sealing and closing of each package.

8. An apparatus according to claim 7, wherein the third pair of linkage arrangements including the sealing means for sealingly closing the open end of each package is placed at a vertical distance from each half of the second pair of linkage arrangements, which vertical distance is adapted so that the flap is pivoted by the two halves of the third pair of linkage arrangements from its first essentially vertical position to its second angled position for pressing two opposing portions of the package towards each other.

9. An apparatus according to claim 1, wherein each of the forming flaps is attached at its first end to an upper side of a respective upstanding arm.

10. An apparatus according to claim 1, wherein each of the forming flaps is generally T-shaped and oriented such that the second end of the flap forms the overhead horizontal leg of the T.

11. An apparatus according to claim 1, further comprising a pair of package engaging members adapted to engage the package from opposite sides of the package, each of the forming flaps being mounted for pivoting movement relative to a respective one of the package engaging members.

12. An apparatus according to claim 11, wherein each package engaging member is U-shaped to engage plural sides of the package.

13. An apparatus according to claim 11, wherein each forming flap is pivotally mounted on the respective package engaging member.

14. An apparatus according to claim 1, further comprising a frame and a motor, the frame comprising a plate-shaped member in a middle section of the frame, the motor being positioned vertically below the plate-shaped member and connected to a rotatably mounted cam disk which is rotatably driven through operation of the motor, the cam disk being positioned vertically below the plate-shaped member.

15. An apparatus according to claim 14, further comprising a vertically oriented guide, a carrier slidably mounted on the guide and operatively engaged with the cam disk so that rotation of the cam disk results in sliding movement of the carrier along the guide, and a link operatively connected between the carrier and at least one of the sealing halves to transmit sliding movement of the carrier produced by rotation of the cam disk into movement of the at least one of the sealing halves.

16. An apparatus according to claim 14, further comprising a vertically oriented guide, a carrier slidably mounted on the guide and operatively engaged with the cam disk so that rotation of the cam disk results in sliding movement of the carrier along the guide, and a link operatively connected between the carrier and at least one of the forming flaps to transmit sliding movement of the carrier produced by rotation of the cam disk into pivoting movement of the at least one sealing flap.

17. An apparatus for sealing a package having an open end, the apparatus comprising:

at least one pair of sealing halves, which are reciprocally movable between an open position and a closed sealing position, one of the sealing halves comprising sealing means for sealingly closing the open end of the package, forming means for forming the package comprising a pair of forming flaps, each forming flap being associated with a sealing half and each forming flap possessing a first end pivotally attached to a support, each forming flap being directly pushed by the associated sealing half during at least part of the reciprocal movement of the associated sealing half to pivotally move the forming flap toward the package, the forming flaps during the movement of the sealing halves towards the closed sealing position pressing two opposing portions of the package towards each other, at least three pairs of linkage arrangements including a first pair of linkage arrangements with two reciprocally movable halves provided with pressing means for pressing on opposing portions of the package at a distance from the open end thereof, a second pair of linkage arrangements that include the forming flaps for forming each package adjacent the open end thereof, and a third pair of linkage arrangements that include the one pair of halves which are reciprocally movable between the open and closed positions, wherein the first pair of linkage arrangements is connected to a first carrier movably provided on a guide, the second pair of linkage arrangements is connected to a second carrier movably provided on said guide, and the third pair of linkage arrangements is connected to a third carrier movably provided on said guide, and the first, second and third carriers are connected to a cam curve disc.

18. An apparatus according to claim 17, wherein each half of the first pair of linkage arrangements comprises an arm which in a first end is provided with the pressing means for pressing on a portion of the package at a distance from the open end thereof and which in a second end is pivotably connected to the first carrier by a link, and which between the first and second ends is provided with a fixed pivot point.

19. An apparatus according to claim 17, wherein each half of the second pair of linkage arrangements comprises a first and a second arm, which first and second arms being connected to each other in first ends thereof and provided with the forming means for forming each package adjacent the open end thereof, which first arm in a second end is pivotably connected to the second carrier by a link and which between the first and second ends is provided with a fixed pivot point, and which second arm in a second end is fixed and which in between the first and second ends is provided with a fixed pivot point.

20. An apparatus according to claim 19, wherein the fixed pivot point of the first arm is arranged substantially at the same distance from the forming means in a vertical direction as the fixed second end of the second arm, so that the pivotable portion of the first arm is longer than the pivotable portion of the second arm.

21. An apparatus according to claim 17, wherein each half of the third pair of linkage arrangements comprises an arm which in a first end is provided with the sealing means for closing and sealing the open end of each package and which in a second end is pivotably connected to the third carrier by a link, and which between the first and second ends is provided with a fixed pivot point.

22. An apparatus according to claim 21, wherein the fixed pivot point of the arm of each half of the first linkage arrangements and the fixed pivot point of the arm of each half of the third linkage arrangements are arranged substantially at the fixed pivot point of the first arm and the fixed second end of the second arm of each half of the second linkage arrangements in the vertical direction.

23. An apparatus according to claim 17, wherein the third carrier is connected to the cam curve disc via a fourth carrier.

24. An apparatus according to claim 23, wherein the fourth carrier is connected to the third carrier via an actuation member, which actuation member is adapted to change the mutual distance between the third and fourth carriers along the guide for biasing the sealing means for closing and sealing the open end of each package.

25. An apparatus for sealing a package having an open end, the apparatus comprising:

at least one pair of sealing halves reciprocally movable between an open position and a closed sealing position, one of the halves comprising sealing means for sealingly closing the open end of the package while the at least one pair of sealing halves are in the closed sealing position;

forming means for forming the package adjacent the open end of the package, the forming means comprising a pair of forming flaps positioned below the sealing means, each forming flap being associated with a sealing half, each forming flap possessing a first end pivotally attached to a support and a second end adapted to follow the reciprocal movement of the associated sealing half; and the forming flaps and the sealing halves being positioned relative to one another such that during the movement of the sealing halves towards the closed sealing position, each of the sealing halves moves from being out of contact with the forming flaps to being in contact with a portion of one of the forming flaps to move the forming flaps into contact with two opposing portions of the package to press the two opposing portions of the package towards each other.

26. An apparatus according to claim 25, further comprising a frame and a motor, the frame comprising a plate-shaped member in a middle section of the frame, the motor being positioned vertically below the plate-shaped member and connected to a rotatably mounted cam disk which is rotatably driven through operation of the motor, the cam disk being positioned vertically below the plate-shaped member.

27. An apparatus according to claim 26, further comprising a vertically oriented guide, a carrier slidably mounted on the guide and operatively engaged with the cam disk so that rotation of the cam disk results in sliding movement of the carrier along the guide, and a link operatively connected between the carrier and at least one of the sealing halves to transmit sliding movement of the carrier produced by rotation of the cam disk into movement of the at least one of the sealing halves.

28. An apparatus according to claim 26, further comprising a vertically oriented guide, a carrier slidably mounted on the guide and operatively engaged with the cam disk so that rotation of the cam disk results in sliding movement of the carrier along the guide, and a link operatively connected between the carrier and at least one of the forming flaps to transmit sliding movement of the carrier produced by rotation of the cam disk into pivoting movement of the at least one sealing flap.

* * * * *